US009028317B2

(12) United States Patent
Frick et al.

(10) Patent No.: US 9,028,317 B2
(45) Date of Patent: May 12, 2015

(54) CARD BASED INSTANT LOTTERY GAME AND SYMBOL MATCHING DRAW BASED LOTTERY GAME CONFIGURATION

(75) Inventors: Michael D. Frick, Crawfordville, FL (US); Mark B. Davis, San Juan, PR (US); David Richard Mizeur, Springfield, IL (US); Stan Pade, North Arlington, NJ (US)

(73) Assignee: Lottery Dynamics LLC, Key Biscayne, FL (US)

( * ) Notice: Subject to any disclaimer, the term of this patent is extended or adjusted under 35 U.S.C. 154(b) by 545 days.

(21) Appl. No.: 13/486,851

(22) Filed: Jun. 1, 2012

(65) Prior Publication Data

US 2013/0324212 A1 Dec. 5, 2013

(51) Int. Cl.
*A63F 9/24* (2006.01)
*G06F 17/00* (2006.01)
*A63F 1/04* (2006.01)
*A63F 3/06* (2006.01)
*G07F 17/32* (2006.01)
*A63F 1/00* (2006.01)

(52) U.S. Cl.
CPC ................. *A63F 1/04* (2013.01); *A63F 3/0605* (2013.01); *A63F 2001/005* (2013.01); *A63F 3/0655* (2013.01); *G07F 17/326* (2013.01); *G07F 17/329* (2013.01)

(58) Field of Classification Search
None
See application file for complete search history.

(56) References Cited

U.S. PATENT DOCUMENTS

| | | | | | |
|---|---|---|---|---|---|
| 4,174,857 | A * | 11/1979 | Koza | | 283/101 |
| 6,328,308 | B1 * | 12/2001 | Kirby | | 273/299 |
| 6,446,968 | B1 * | 9/2002 | Koch | | 273/243 |
| 6,520,502 | B1 * | 2/2003 | Drouhard | | 273/242 |
| 6,554,279 | B1 * | 4/2003 | Vanderhye | | 273/236 |
| 6,588,756 | B1 * | 7/2003 | Hughes | | 273/292 |
| 6,623,010 | B1 * | 9/2003 | Holland, Jr. | | 273/292 |
| 2002/0066999 | A1 * | 6/2002 | Rossi | | 273/243 |
| 2002/0077167 | A1 * | 6/2002 | Merari | | 463/13 |
| 2005/0250575 | A1 * | 11/2005 | Kane et al. | | 463/17 |
| 2006/0040242 | A1 * | 2/2006 | Mejia | | 434/170 |
| 2006/0100008 | A1 * | 5/2006 | Wright et al. | | 463/17 |
| 2006/0160602 | A1 * | 7/2006 | Blythe et al. | | 463/17 |
| 2006/0261545 | A1 * | 11/2006 | Rogers | | 273/139 |
| 2009/0061980 | A1 * | 3/2009 | Holton et al. | | 463/17 |
| 2011/0281629 | A1 * | 11/2011 | Meyer | | 463/17 |
| 2011/0281637 | A1 * | 11/2011 | Meyer | | 463/22 |
| 2012/0122539 | A1 * | 5/2012 | Khal et al. | | 463/19 |
| 2013/0200606 | A1 * | 8/2013 | Omar | | 283/74 |

* cited by examiner

*Primary Examiner* — Paul A D'Agostino
(74) *Attorney, Agent, or Firm* — Patent Ingenuity, P.C.; Samuel K. Simpson

(57) ABSTRACT

An instant lottery game and a draw based lottery game may be established. The instant lottery game is based on a set of rules of a playing card game. The draw based lottery game is based on a symbol matching set of rules. A random selection of a subset of a deck of playing card indicia may be generated concurrently with a purchase of a lottery ticket having the instant lottery game and the draw based lottery game. A ticket printer prints the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia.

20 Claims, 11 Drawing Sheets

600

Prize Structure Configuration

602

Card Based Instant Lottery Game Prize Structure

| Playing Card Hand | Prize |
|---|---|
| Royal Flush | $1,000 |
| Straight Flush | $100 |
| 4 of a Kind | $50 |
| Full House | $10 |
| Flush | $8 |
| Straight | $5 |
| 3 of a Kind | $2 |
| 2 Pairs | $1 |
| 1 Pair (Jacks +) | Free Ticket |

604

Symbol Matching Draw Based Lottery Game Prize Structure

| Match Quantity | Prize |
|---|---|
| 5 of 5 | $10,000 |
| 4 of 5 | $1,000 |
| 3 of 5 | $100 |
| 2 of 5 | $20 |

*Figure 6*

CARD BASED INSTANT LOTTERY GAME AND SYMBOL MATCHING DRAW BASED LOTTERY GAME CONFIGURATION

BACKGROUND

1. Field

This disclosure generally relates to the field of gaming. More particularly, the disclosure relates to games of chance.

2. General Background

An instant lottery game typically allows a player to determine if he or she has won the lottery game instantly and the exact amount of the prize won instantly. The instant lottery game may be operated through a terminal at a lottery vendor. For example, the lottery vendor may have an instant lottery ticket dispensing machine that communicates with a central server. The instant lottery ticket dispensing machine may determine the assortment of indicia on the instant lottery game ticket at the time the instant lottery game ticket is purchased.

However, the sale of terminal generated instant lottery game tickets may involve a phenomenon called palming. When a player orders an instant lottery ticket at a point-of-sale location, the vendor may be able to quickly look at certain types of instant lottery game tickets and quickly determine if the instant lottery game ticket is a winning ticket prior to and/or during sale of the instant lottery game ticket. The vendor may then surreptitiously take that winning lottery game ticket for himself or herself and quickly provide the purchaser with another instant lottery ticket that may not be a winning instant lottery ticket. As a result, players may unfairly not receive their prizes. Further, potential instant lottery game players may be discouraged from purchasing instant lottery game tickets. Consequently, palming has functioned as a constraint on the sale of many terminal generated instant lottery games.

In addition, draw based games are often offered by lotteries. A player may purchase a ticket having thereon a set of numbers or symbols. At a subsequent time after the player purchases the lottery ticket, the lottery may perform a drawing. The drawing is a selection of a set of game winning numbers or symbols. Accordingly, the player may compare the set of numbers or symbols on his or her purchased lottery ticket with the set of subsequently drawn game winning numbers or symbols to determine if a prize winning match results after the comparison. Many of the current draw based games simply lack excitement for the player as the player has nothing else to do to play the game other than make a comparison.

Further, some lottery jurisdictions do not allow instant lottery games to be printed on tickets from a terminal. As a result, such lottery jurisdictions do not have the ability to provide the same types of instant lottery games as other lottery jurisdictions.

SUMMARY

In one aspect of the disclosure, a process is provided. The process establishes an instant lottery game and a draw based lottery game. The instant lottery game is based on a set of rules of a playing card game. The draw based lottery game is based on a symbol matching set of rules. Further, the process generates, with a processor, a random selection of a subset of a deck of playing card indicia concurrently with a purchase of a lottery ticket having the instant lottery game and the draw based lottery game. In addition, the process prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. The process also generates, with the processor, a random selection of a set of player numbers. Further, the process prints, with the ticket printer, the set of player numbers on the lottery ticket such that each player number in the set of player numbers corresponds to one of the indicium in the plurality of order indicia. In addition, the process provides an instant lottery game prize distribution to a player that purchases the ticket if an instant portion of the subset of the deck of playing card indicia associated with a portion of the plurality of order indicia that is determined by the set of player numbers corresponds to a first winning playing card hand according to the set of rules of the playing card game. The process also performs a random selection of a set of draw indicia subsequent to the purchase of the lottery ticket. Further, the process provides a draw based lottery game prize distribution to the player that purchases the ticket if the instant portion of the subset of the deck of playing card indicia matches the set of draw indicia.

In another aspect of the disclosure, a process is provided. The process establishes an instant lottery game. The instant lottery game is based on a set of rules of a playing card game. Further, the process generates, with a processor, a random selection of a subset of a deck of playing card indicia concurrently with a purchase of a lottery ticket having the instant lottery game. In addition, the process prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. The process also generates, with the processor, a random selection of a set of player numbers. Further, the process prints, with the ticket printer, the set of player numbers on the lottery ticket such that each player number in the set of player numbers corresponds to one of the indicium in the plurality of order indicia. In addition, the process provides an instant lottery game prize distribution to a player that purchases the ticket if an instant portion of the subset of the deck of playing card indicia associated with a portion of the plurality of order indicia that is determined by the set of player numbers corresponds to a first winning playing card hand according to the set of rules of the playing card game.

In yet another aspect of the disclosure, a process is provided. The process establishes a draw based lottery game. The draw based lottery game is based on a set of rules of a playing card game. Further, the process generates, with a processor, a random selection of a subset of a deck of playing card indicia concurrently with a purchase of a lottery ticket having the draw based lottery game. In addition, the process prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. The process also performs a random selection of a set of draw indicia subsequent to the purchase of the lottery ticket. Further, the process provides a draw based lottery game prize distribution to a player that purchases the ticket if a portion of the subset of the deck of playing card indicia associated with a portion of the plurality of order indicia that is determined by the set of draw indicia corresponds to a winning playing card hand according to the set of rules of the playing card game.

In another aspect of the disclosure a process is provided. The process establishes a draw based lottery game. The draw based lottery game is based on a set of rules of a playing card game and a symbol matching set of rules. Further, the process generates, with a processor, a random selection of a subset of a deck of playing card indicia concurrently with a purchase of a lottery ticket having the draw based lottery game. In addition, the process prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. The process also performs a random selection of a set of draw indicia subsequent to the purchase of the lottery ticket. Further, the process performs a random selection of a set of draw symbols subsequent to the purchase of the lottery ticket. In addition, the process provides a first draw based lottery game prize distribution to a player that purchases the ticket if a portion of the subset of the deck of playing card indicia associated with a portion of the plurality of order indicia that is determined by the set of draw indicia corresponds to a winning playing card hand according to the set of rules of the playing card game. The process also provides a second draw based lottery game prize distribution to a player that purchases the ticket if a portion of the subset of the deck of playing card indicia associated with a portion of the plurality of order indicia that is determined by the set of draw indicia matches the set of draw symbols.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 6 illustrates a prize structure configuration for the process illustrated in FIGS. 5A and 5B.

DETAILED DESCRIPTION

A method, apparatus, and computer program product may be utilized to provide a card based instant lottery game and a symbol matching draw based lottery game configuration. In one embodiment, the instant lottery game is based on a set of rules of a playing card game whereas the symbol matching draw based lottery game is based upon matching symbols. A symbol may be a playing card symbol, number, or like indicia. Examples of playing card games include poker, blackjack, or the like.

The instant lottery game provides a player with a set of player numbers at the time of purchase of the instant lottery game. The player may then utilize that set of player numbers to find a playing card hand within a randomly generated subset of a deck of cards that is printed on the ticket. After the player determines the hand of cards, he or she may instantly determine whether or not he or she wins a prize according to a set of rules of the playing card game. Accordingly, this configuration helps alleviate palming as a vendor at a point-of-sale location would be unlikely to be able to find the hand quickly enough.

Further, a random selection of draw numbers may be performed after the purchase of the lottery ticket. As an example, a lottery may utilize a lottery random generation apparatus such as a ball hopper to randomly generate a set of draw symbols. All players may then see and/or hear about the set of draw symbols and find that set of draw symbols in each of their randomly generated subsets of the deck of playing cards. Accordingly, the player plays a symbol matching game such that the set of draw symbols are compared with the paying card indicia found in the randomly generated subset of the deck of cards. As a result, a player has an opportunity to play both a card game and a symbol matching game. Further, the player's cards from the card game are utilized for the symbol matching game.

Any of the configurations provided for herein may utilize single pricing or multiple pricing for prize distribution. As an example, a player may spend one dollar to play the game for a single priced game whereas a player may have the option to play the game for one dollar or two dollars and win different prizes based upon the amount spent for purchasing the lottery ticket.

Further, any of the configurations provided for herein may utilize a single price for the card based instant lottery game and the symbol matching draw based lottery game or multiple prices for the card based instant lottery game and the symbol matching draw based lottery game. For example, a player may be able to purchase entry into both the card based instant lottery game and the symbol matching draw based lottery game for one dollar. Alternatively, as an example, the player may have to purchase entry into the card based instant lottery game for one dollar and an entry into the symbol matching draw based game for an additional dollar.

Figure 1:
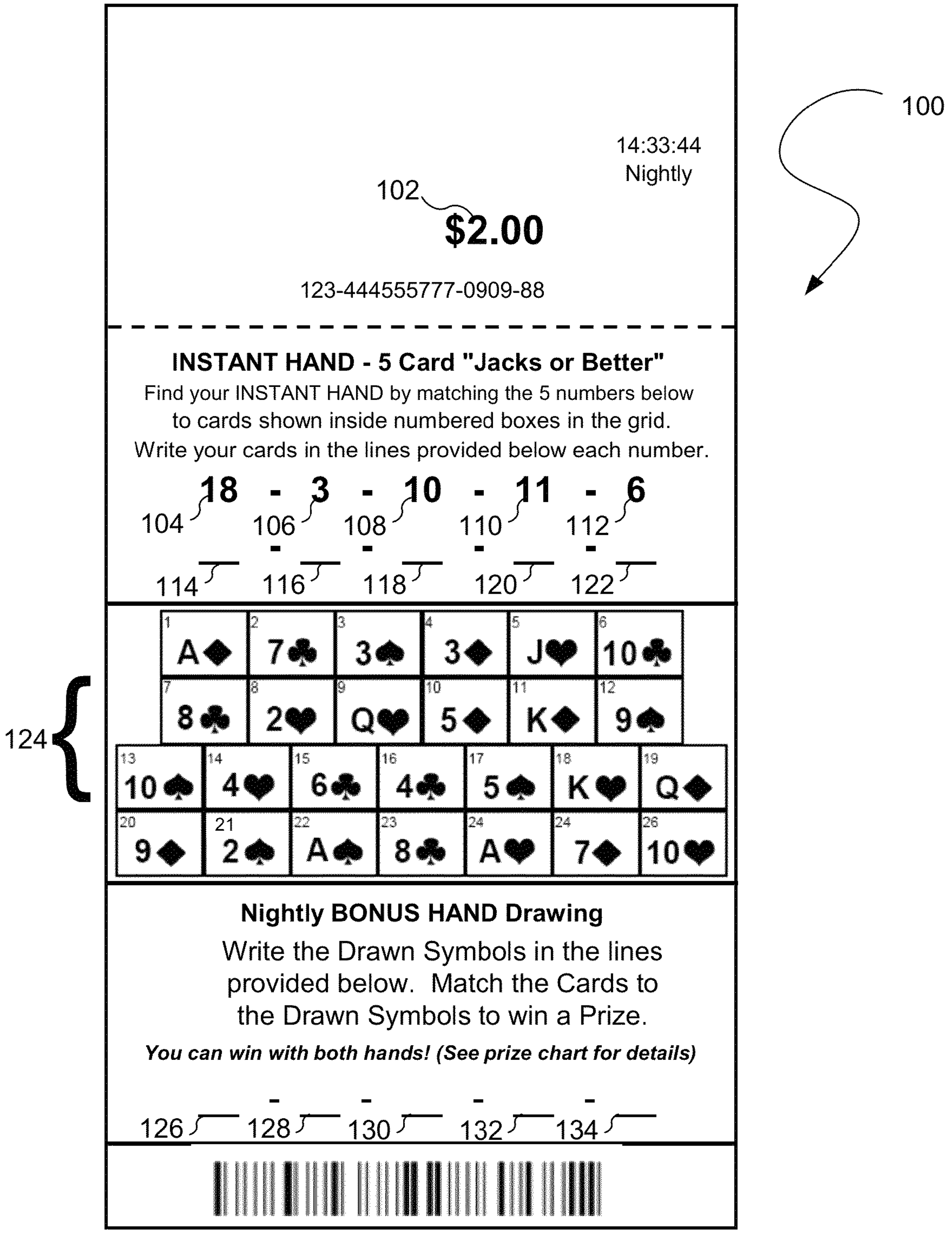
FIG. 1 illustrates an example of a card based instant lottery game and a symbol matching draw based game ticket.

FIG. 1 illustrates an example of a card based instant lottery game and a symbol matching draw based game ticket 100. A player may purchase the ticket for a purchase price 102 of two dollars. The ticket has a set of player numbers that is randomly generated. As an example, the set of player number may be five numbers such as a first player number 104 that is eighteen, a second player number 106 that is three, a third player number 108 that is ten, a fourth player number 110 that is eleven, and a fifth player number 112 that is six. The ticket also has a randomly generated subset of a deck of playing card indicia 124. As an example, a deck of playing card indicia may be a deck of playing cards that includes fifty-two cards that are utilized to play poker. In one embodiment, the randomly generated subset of a deck of playing card indicia 124 includes a subset of playing card indicia of those fifty-two cards that is less than fifty-two in quantity. As an example, the randomly generated subset of the deck of playing card indicia 124 may include four rows with the first row having six playing card indicia, the second row having six playing card indicia, the third row having seven playing card indicia, and the fourth row having seven playing card indicia for a total of twenty-six playing card indicia. Since each instant lottery ticket has a randomly generated set of player numbers and a randomly generated subset of the deck of playing card indicia 124, the odds are very low that two tickets will have the same randomly generated set of player numbers and randomly generated subset of the deck of playing card indicia 124. In another embodiment, the randomly generated subset of a deck of playing card indicia 124 includes an entire set of playing card indicia of those fifty-two cards that is less than fifty-two in quantity.

In one embodiment, the randomly generated subset of the deck of playing card indicia 124 is printed according to the order of the random selection. For example, the Ace of Diamonds was randomly selected first and is, therefore, printed first in the randomly generated subset of the deck of playing card indicia 124. Further, as an example, the Seven of Clubs was randomly selected second and is, therefore, printed second in the randomly generated subset of the deck of playing card indicia 124. An order indicium indicating the order of the selection of the playing card indicia is also printed. As an example, since the Ace of Diamonds was randomly selected first, an order indicium of one is printed in the box of the Ace of Diamonds. Alternatively, the order indicium may be printed outside the box, in proximity, or in any other manner that indicates that the Ace of Diamonds was randomly selected first. Further, as an example, since the Seven of Clubs was randomly selected second, an order indicium of two is printed in the box of the Seven of Clubs.

Various other types of structures may be utilized to display the randomly generated subset of the deck of playing card indicia 124 on the instant lottery game and draw based game ticket 100. For example, grid structures with different numbers of rows and columns, grid structures with other types of shapes, or the like may be utilized. The player utilizes the set of player numbers to find corresponding order indicia in the randomly generated subset of the deck of playing card indicia 124. The player may then enter the playing card indicia in a first instant playing card indicia field 114, a second instant playing card indicia field 116, a third instant playing card indicia field 118, a fourth instant playing card indicia field 120, and a fifth instant playing card indicia field 122.

In one embodiment, the same randomly generated subset of the deck of playing card indicia 124 that is utilized for the instant lottery game is utilized for the draw based lottery game. For example, at a time subsequent to the player's purchase of the card based instant lottery game and symbol matching draw based game ticket 100, a lottery may perform a drawing for a set of draw numbers. Each player of the draw based lottery game utilizes the same set of draw numbers to find corresponding order indicia in his or her own ticket with randomly generated subset of the deck of playing card indicia 124 that will most likely be different in the majority of instances for each player of the draw based lottery game. The player may then enter the playing card indicia in a first drawing playing card indicia field 126, a second drawing playing card indicia field 128, a third drawing playing card indicia field 130, a fourth drawing playing card indicia field 132, and a fifth drawing playing card indicia field 134. In another embodiment, separate subsets of the deck of playing card indicia are generated for the instant lottery game and the draw based lottery game.

In one embodiment, the randomly generated subset of the deck of playing card indicia 124 has to be a subset of the deck of playing card indicia 124 that is less in quantity than the deck of playing card indicia to keep the odds of wins in the instant lottery game relatively low and to keep every player from being a winner in the draw based game as all players utilizing the same set of draw numbers with a full deck of playing cards would result in all players being winners. In yet another embodiment, the subset of the deck of playing card indicia 124 may be the entire deck of the playing card indicia.

In one embodiment, the symbol matching draw based lottery game is based upon matching of symbols between drawn symbols and symbols determined from the card based instant lottery game. In other words, the symbol matching draw based lottery game may be based on a symbol matching set of rules rather than a card based game set of rules. For example, a player may win a prize in the card based game for obtaining a royal flush. If that player does not obtain a royal flush or another card based game hand, that player may not win a card based instant lottery game prize. The hand may still be eligible for a symbol matching draw based lottery game prize. If the symbols in the hand match a certain quantity of symbols in the draw based lottery game, the player may win a draw based lottery game prize even through a card based game hand was not obtained for an instant lottery game prize. A player may potentially win a prize in either or both the card based instant lottery game and the symbol matching draw based lottery game.

Figure 2:
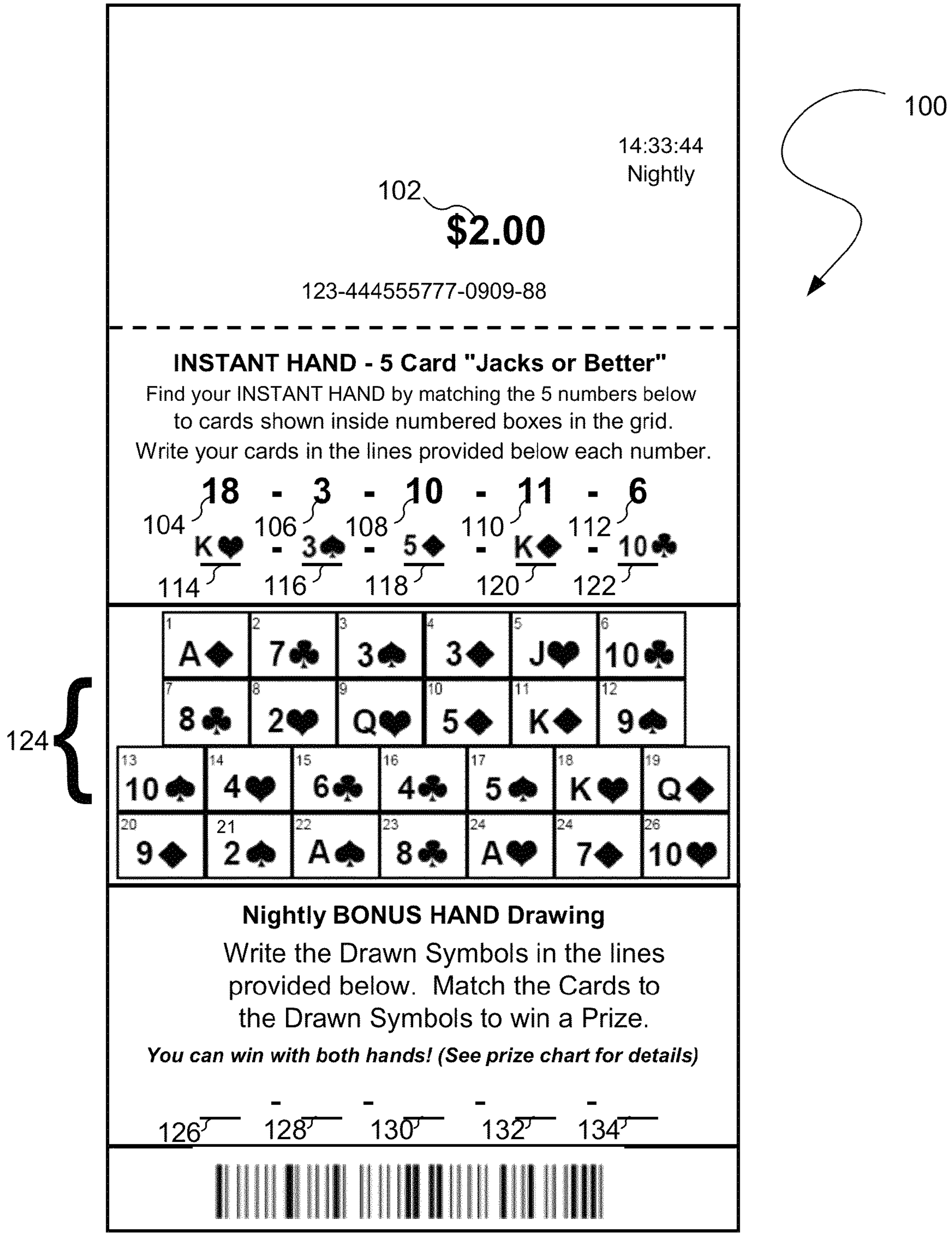
FIG. 2 illustrates the card based instant lottery game and symbol matching draw based game ticket of FIG. 1 with the card based instant playing card indicia fields after player input.

FIG. 2 illustrates the card based instant lottery game and symbol matching draw based game ticket 100 of FIG. 1 with the card based instant playing card indicia fields after player input. For example, as the first player number 104 is eighteen, the player looks at the order indicium of eighteen in the randomly generated subset of the deck of playing card indicia 124 to discover a King of Hearts. Accordingly, the player may enter the King of Hearts in the first instant playing card indicia field 114. Further, as an example, as the second player number 106 is three, the player looks at the order indicium of three to discover a Three of Spades. Accordingly, the player may enter the Three of Spades in the second instant playing card indicia field 116. In addition, as an example, as the third player number 108 is ten, the player looks at the order indicium of ten to discover a Five of Diamonds. Accordingly, the player may enter the Five of Diamonds in the third instant playing card indicia field 118. As an example, as the fourth player number 110 is eleven, the player looks at the order indicium of eleven to discover a King of Diamonds. Accordingly, the player may enter the King of Diamonds in the fourth instant playing card indicia field 120. Further, as an example, as the fifth player number 112 is six, the player looks at the order indicium of six to discover a Ten of Clubs. Accordingly, the player may enter the Ten of Clubs in the fifth instant playing card indicia field 122. As a result, the player has a winning card based instant hand of a pair of Kings. The player then reviews the prize structure of the instant lottery game to determine what type of instant prize, if any, the player may win for the pair of Kings.

Figure 3:
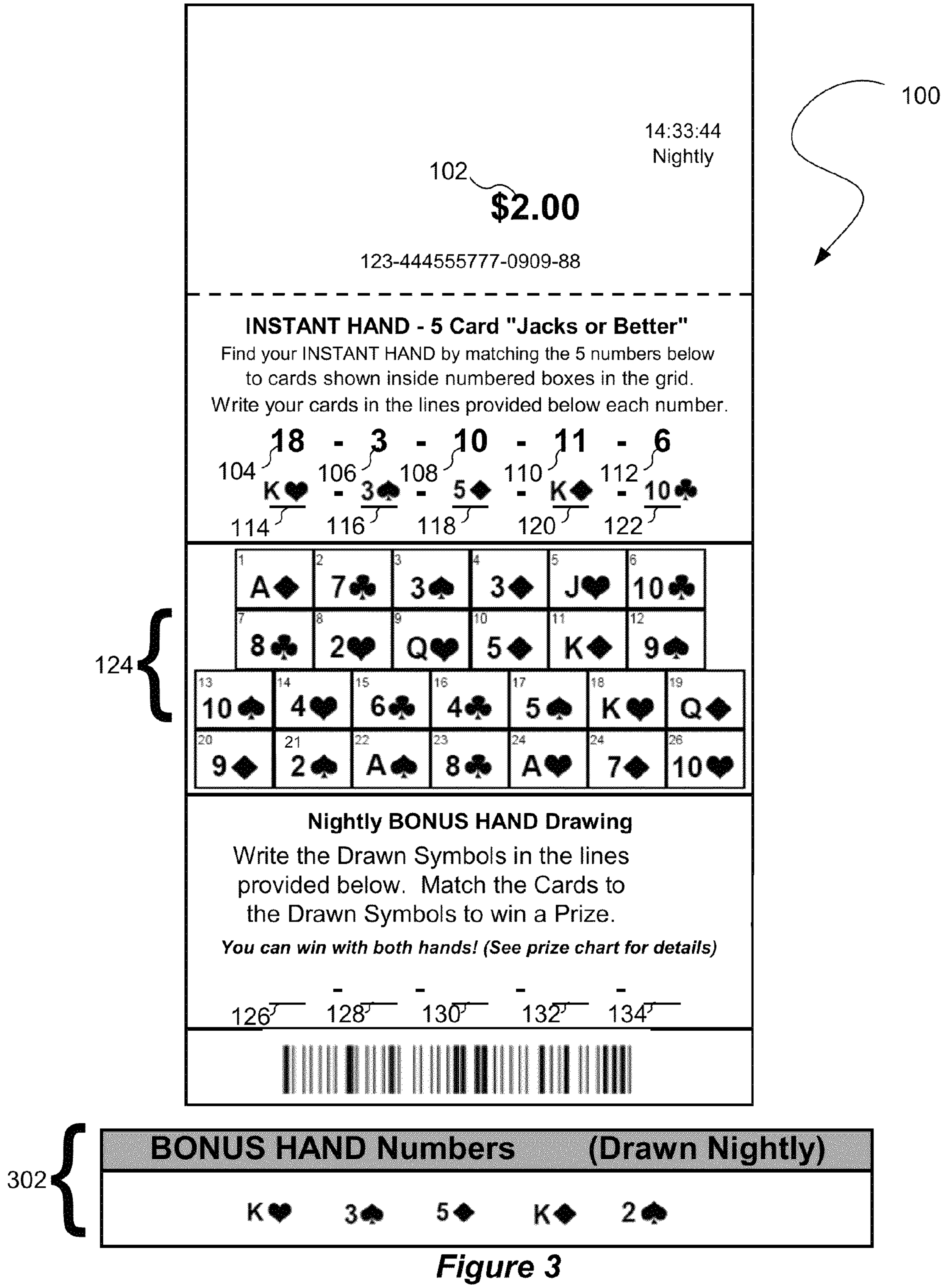
FIG. 3 illustrates the card based instant lottery game and symbol matching draw based game ticket of FIG. 2 and a set of draw indicia.

FIG. 3 illustrates the card based instant lottery game and symbol matching draw based game ticket 100 of FIG. 2 and a set of draw indicia 302. As an example, the set of draw indicia may include a King of Hearts, a Three of Spades, a Five of Diamonds, a King of Diamonds, and a Two of Spades.

Figure 4:
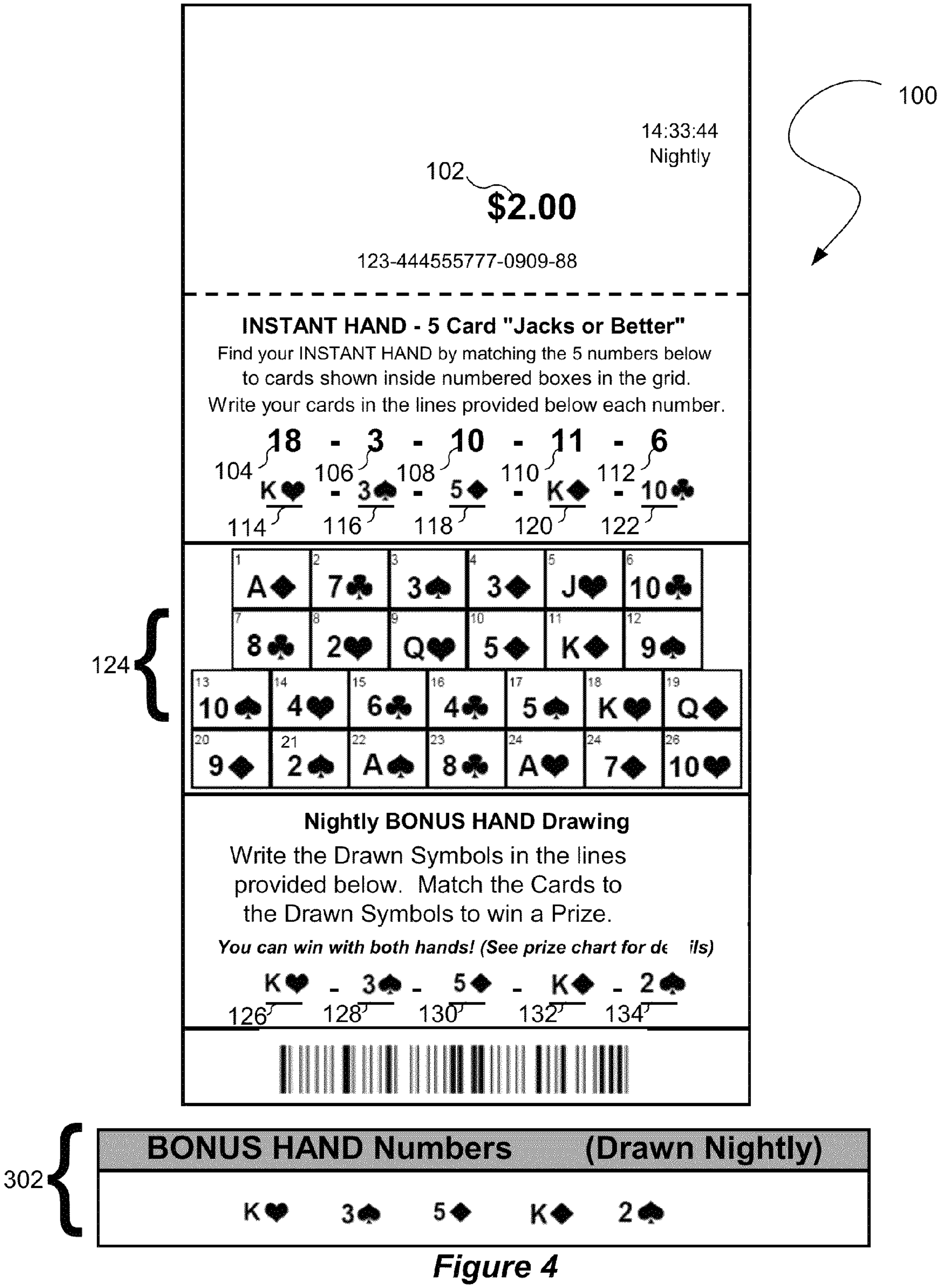
FIG. 4 illustrates the card based instant lottery game and symbol matching draw based game ticket and the set of draw numbers of FIG. 3 with the draw playing card indicia fields after player input.

FIG. 4 illustrates the card based instant lottery game and symbol matching draw based game ticket 100 and the set of draw numbers 302 of FIG. 3 with the draw playing card indicia fields after player input. For example, as the first draw indicia is a King of Hearts, the player may enter the King of Hearts in the first draw playing card indicia field 126. Further, as an example, as the second draw indicia is Three of Spades, the player may enter the Three of Spades in the second draw playing card indicia field 128. In addition, as an example, as the third draw indicia is Five of Diamonds, the player may enter the Five of Diamonds in the third draw playing card indicia field 130. As an example, as the fourth draw indicia is King of Diamonds, the player may enter the King of Diamonds in the fourth draw playing card indicia field 132. Further, as an example, as the fifth draw indicia is Two of Spades, the player may enter the Two of Spades in the fifth drawings playing card indicia field 134. As a result, the player has a match of four out of five symbols with the card based instant hand indicia. Accordingly, the player may win a draw based prize for a four out of five match.

In one embodiment, the order of the symbols drawn by the lottery is pertinent to the match. In other words, the symbols may have to be matched in the order drawn by the lottery. In another embodiment, the order of the symbols drawn by the lottery may not be pertinent. Accordingly, the player may win a drawing based prize based upon a matching of symbols irrespective of order.

The player then reviews the prize structure of the instant lottery game to determine what type of prize, if any, the player may win for either game. In one embodiment, the number of indicia is the same for both games. In another embodiment, the number of indicia is different for both games.

Figure 5A:
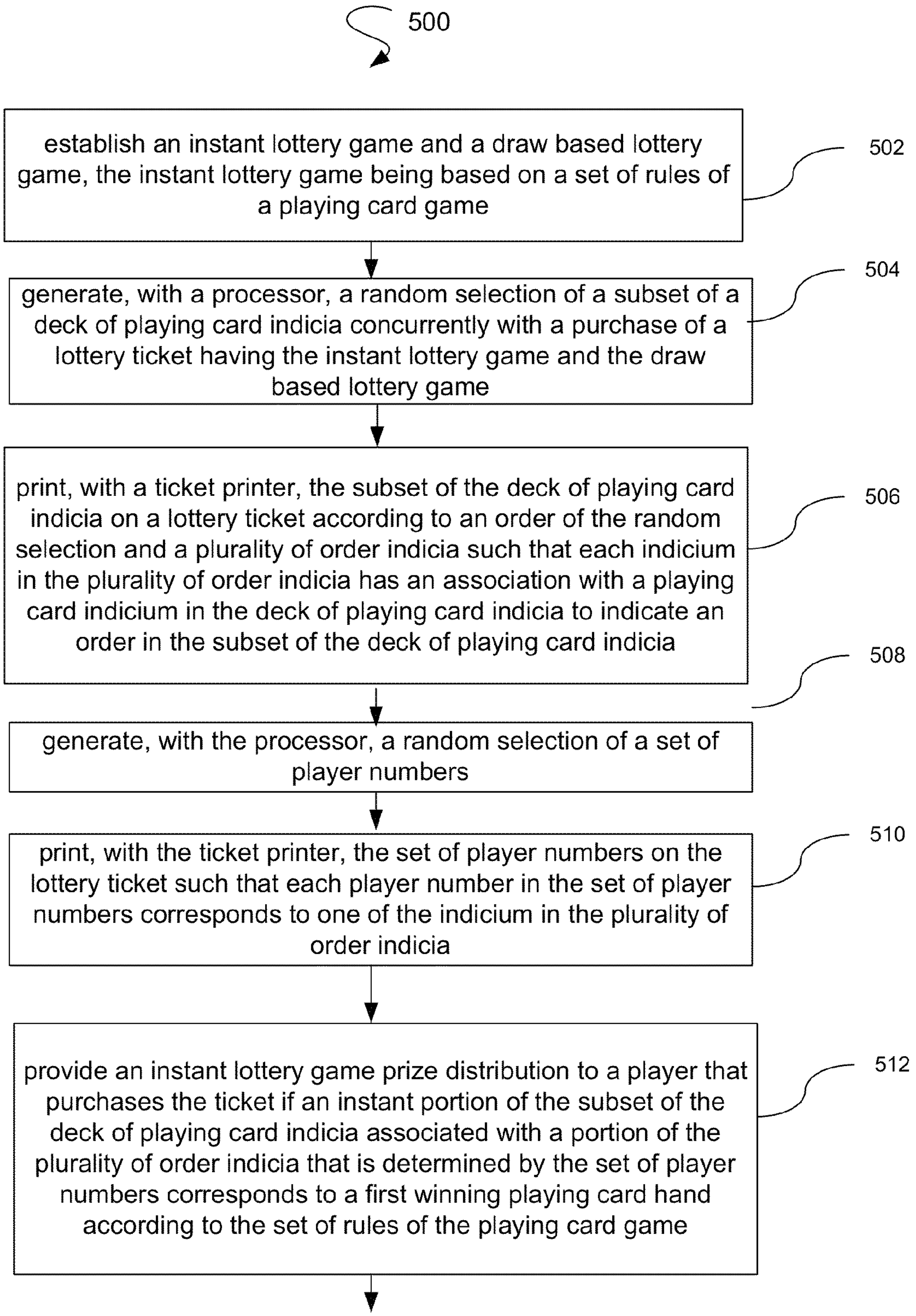
FIGS. 5A and 5B illustrate a process in which entry into the card based instant lottery game provides automatic eligibility for an entry into the symbol matching draw based lottery game.
Figure 5B:
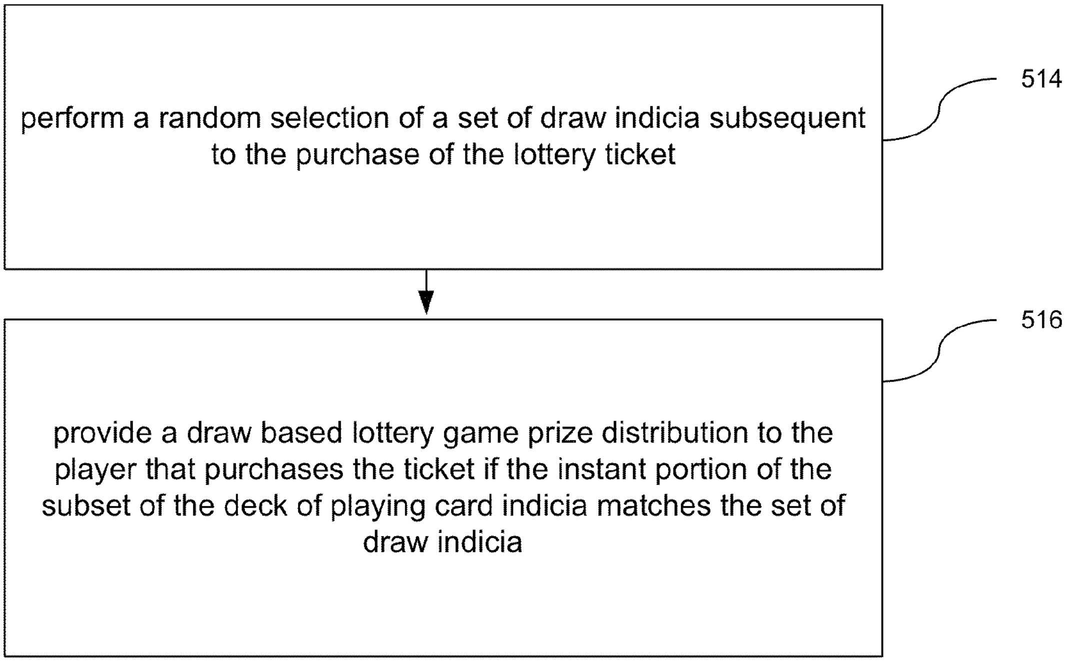

In one embodiment, any of the configurations provided for herein may be utilized such that play of the card based instant game automatically results in play of the symbol matching draw based game. FIGS. 5A and 5B illustrate a process 500 in which entry into the card based instant lottery game provides automatic eligibility for an entry into the symbol matching draw based lottery game. At a process block 502, the process 500 establishes an instant lottery game and a draw based lottery game. The instant lottery game is based on a set of rules of a playing card game. The draw based lottery game is based on a symbol matching set of rules. Further, at a process block 504, the process 500 generates, with a processor, a random selection of a subset of a deck of playing card indicia concurrently with a purchase of a lottery ticket having the instant lottery game and the draw based lottery game. In addition, at a process block 506, the process 500 prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. At a process block 508, the process 500 also generates, with the processor, a random selection of a set of player numbers. Further, at a process block 510, the process 500 prints, with the ticket printer, the set of player numbers on the lottery ticket such that each player number in the set of player numbers corresponds to one of the indicium in the plurality of order indicia. In addition, at a process block 512, the process 500 provides an instant lottery game prize distribution to a player that purchases the ticket if an instant portion of the subset of the deck of playing card indicia associated with a portion of the plurality of order indicia that is determined by the set of player numbers corresponds to a first winning playing card hand according to the set of rules of the playing card game. At a process block 514, the process 500 also performs a random selection of a set of draw indicia subsequent to the purchase of the lottery ticket. Further, at a process block 516, the process 500 provides a draw based lottery game prize distribution to the player that purchases the ticket if the instant portion of the subset of the deck of playing card indicia matches the set of draw indicia.

FIG. 6 illustrates a prize structure configuration 600 for the process 500 illustrated in FIGS. 5A and 5B. In one embodiment, the process 500 may be implemented with separate prize structures for the card based instant lottery game and the symbol matching draw based lottery game. Accordingly, a card based instant lottery game prize structure 602 may be utilized for the card based instant lottery game and a symbol matching draw based lottery game prize structure 604 may be utilized for the symbol matching draw based lottery game. As an example, the card based instant lottery game prize structure 602 allows a player to win a one thousand dollar prize for a Royal Flush, a one hundred dollar prize for a Straight Flush, a fifty dollar prize for a Four of a Kind, a ten dollar prize for a Full House, an eight dollar prize for a Flush, a five dollar prize for a Straight, a two dollar prize for a Three of a Kind, a one dollar prize for Two Pairs, or a Free Ticket for a Pair that is at least a Pair of Jacks in rank. As another example, the symbol matching draw based lottery game prize structure 604 allows a player to win a ten thousand dollar prize for a five of five match, a one thousand dollar prize for a four of five match, a one hundred dollar prize for a three of five match, and a twenty dollar prize for a two of five match.

Although card symbols are utilized as an example, other types of indicia may be utilized. Other possibilities include numbers, shapes, or the like.

In one embodiment, any of the configurations provided for herein may be utilized such that eligibility for an entry into the symbol matching draw based lottery game is determined based upon a criteria associated with the card based instant lottery game. For example, at least a certain type a playing card hand in the card based instant lottery game, e.g., at least a pair of Jacks, may have to occur in the card based instant lottery game for the player to enter the symbol matching draw based lottery game. Another example of criteria is the player not having any win in the card based instant lottery game.

Figure 7:
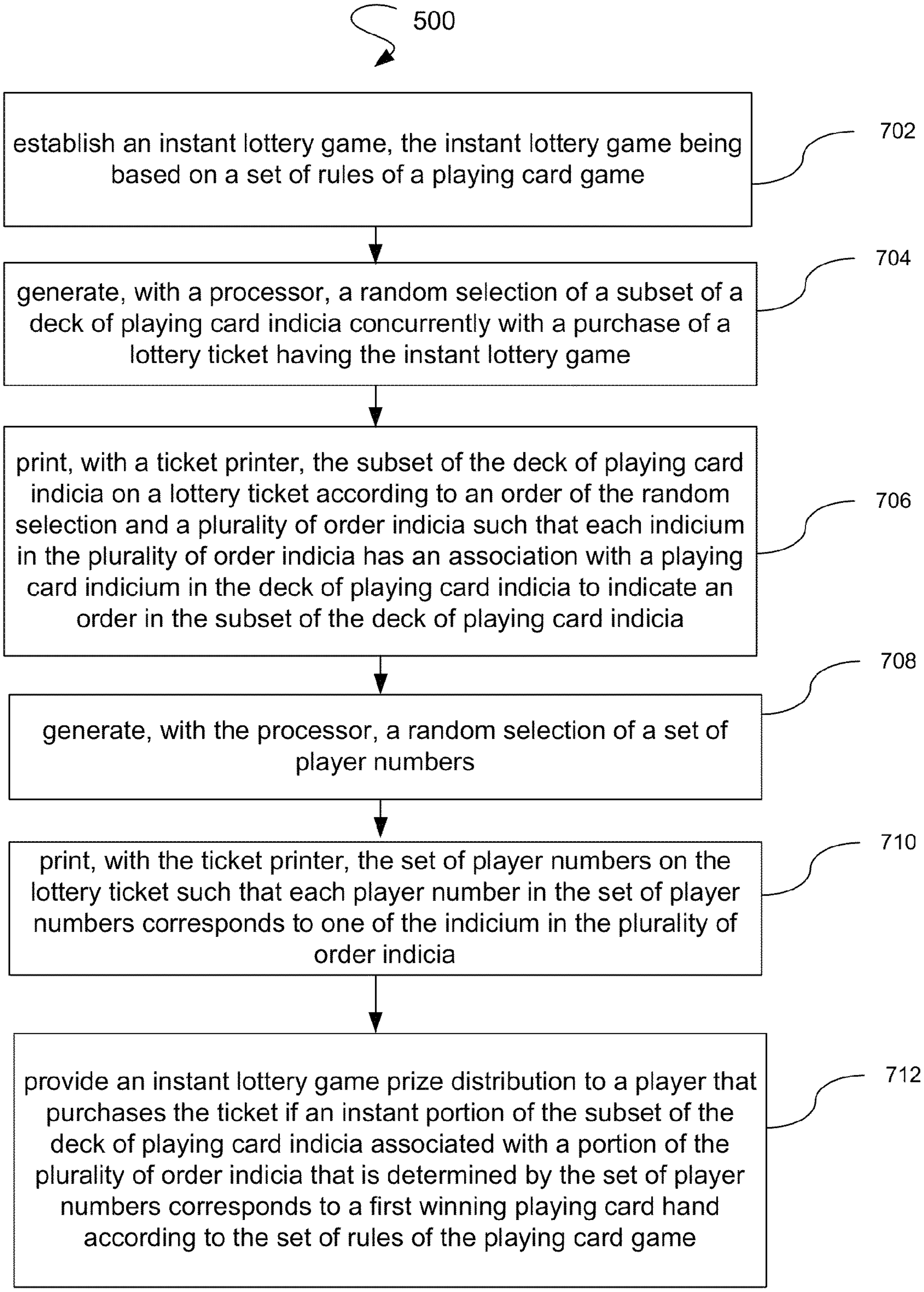
FIG. 7 illustrates a process that may be utilized for a card based instant lottery game.

In yet another embodiment, the card based instant lottery game may be utilized without the symbol matching drawing lottery game. FIG. 7 illustrates a process 700 that may be utilized for a card based instant lottery game. At a process block 702, the process 700 establishes an instant lottery game. The instant lottery game is based on a set of rules of a playing card game. Further, at a process block 704, the process 700 generates, with a processor, a random selection of a subset of a deck of playing card indicia concurrently with a purchase of a lottery ticket having the instant lottery game. In addition, at a process block 706, the process 700 prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. At a process block 708, the process 700 also generates, with the processor, a random selection of a set of player numbers. Further, at a process block 710, the process 700 prints, with the ticket printer, the set of player numbers on the lottery ticket such that each player number in the set of player numbers corresponds to one of the indicium in the plurality of order indicia. In addition, at a process block 712, the process 700 provides an instant lottery game prize distribution to a player that purchases the ticket if an instant portion of the subset of the deck of playing card indicia associated with a portion of the plurality of order indicia that is determined by the set of player numbers corresponds to a first winning playing card hand according to the set of rules of the playing card game.

Figure 8:
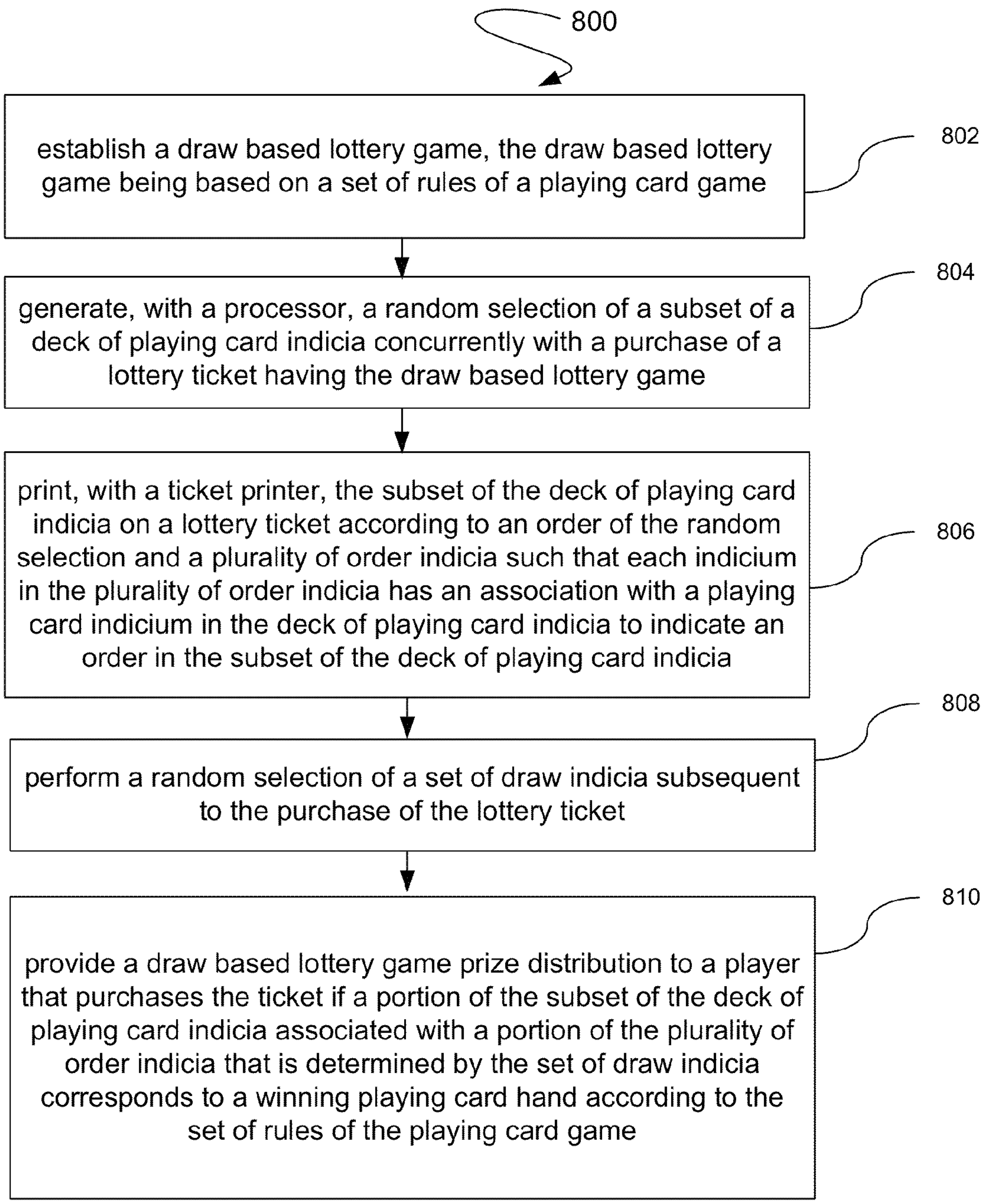
FIG. 8 illustrates a process that may be utilized for a card based draw lottery game.

In yet another embodiment, a configuration may be provided to provide a card based draw game. For example, a jurisdiction may be prevented from implementing a terminal generated instant game. Accordingly, the card based draw game may be utilized in such a jurisdiction. FIG. 8 illustrates a process 800 that may be utilized for a card based draw lottery game. At a process block 802, the process 800 establishes a draw based lottery game. The draw based lottery game is based on a set of rules of a playing card game. Further, at a process block 804, the process 800 generates, with a processor, a random selection of a subset of a deck of playing card indicia concurrently with a purchase of a lottery ticket having the draw based lottery game. In addition, at a process block 806, the process 800 prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. At a process block 808, the process 800 also performs a random selection of a set of draw indicia subsequent to the purchase of the lottery ticket. Further, at a process block 810, the process 800 provides a draw based lottery game prize distribution to a player that purchases the ticket if a portion of the subset of the deck of playing card indicia associated with a portion of the plurality of order indicia that is determined by the set of draw indicia corresponds to a winning playing card hand according to the set of rules of the playing card game.

Figure 9:
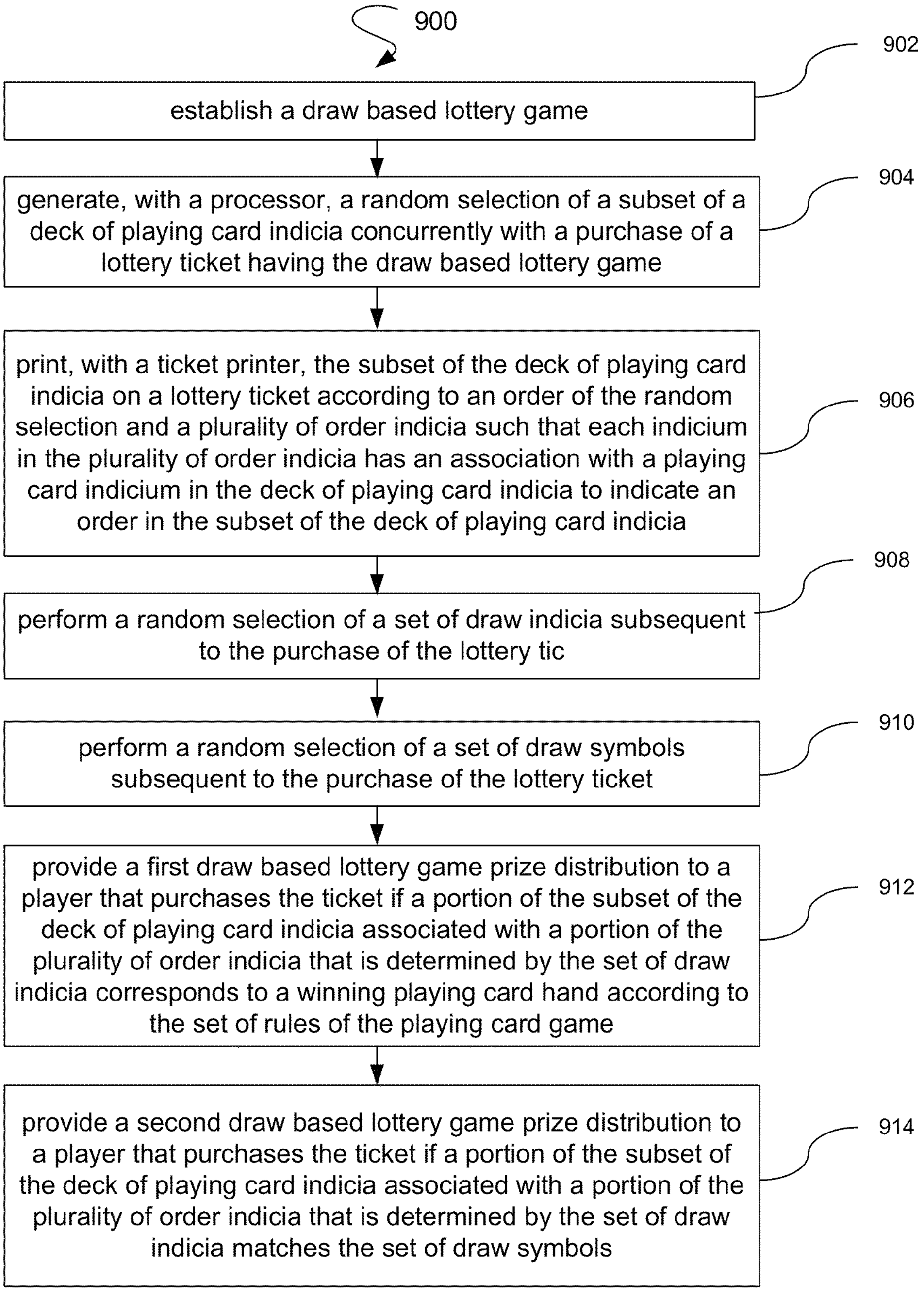
FIG. 9 illustrates a process that may be utilized for a card based draw game and a symbol matching draw game.

In yet another embodiment, a card based draw game and a symbol matching draw game may be utilized. In other words, a lottery may perform two drawings. FIG. 9 illustrates a process 900 that may be utilized for a card based draw game and a symbol matching draw game. At a process block 902, the process 900 establishes a draw based lottery game. The draw based lottery game is based on a set of rules of a playing card game and a symbol matching set of rules. Further, at a process bock 904, the process 900 generates, with a processor, a random selection of a subset of a deck of playing card indicia concurrently with a purchase of a lottery ticket having the draw based lottery game. In addition, at a process block 906, the process 900 prints, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia. At a process block 908, the process 900 also performs a random selection of a set of draw indicia subsequent to the purchase of the lottery ticket. Further, at a process block 910, the process 900 performs a random selection of a set of draw symbols subsequent to the purchase of the lottery ticket. In addition, at a process block 912 the process provides a first draw based lottery game prize distribution to a player that purchases the ticket if a portion of the subset of the deck of playing card indicia associated with a portion of the plurality of order indicia that is determined by the set of draw indicia corresponds to a winning playing card hand according to the set of rules of the playing card game. At a process block 914, the process 900 also provides a second draw based lottery game prize distribution to a player that purchases the ticket if a portion of the subset of the deck of playing card indicia associated with a portion of the plurality of order indicia that is determined by the set of draw indicia matches the set of draw symbols.

In another embodiment, another prize distribution may be provided for any of the configurations provided herein based upon the outcomes of the instant lottery game and the draw based lottery game. For example, the instant lottery game may or may not give a prize for a certain instant lottery outcome and the draw based lottery game may or may not give a prize for a certain draw based lottery outcome, but a combined outcome prize distribution may provide a prize for a certain combination of outcomes in the instant lottery game and the draw based lottery game.

The prizes provided for herein may be a variety of prizes. For example, the prizes may include fixed prizes, pari-mutuel prizes, progressive prizes, probabilities-based prizes, or the like.

In an alternative embodiment, a set of rules other than a set of card game based rules may be utilized for any of the configurations provided for herein. As an example, a set of board game rules may be utilized. As another example, the set of rules may include a condition that a value in a grid has to be greater than, greater than or equal to, equal to, lesser than, or lesser than or equal to a predetermined value.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

A computer is herein intended to include any device that has a general, multi-purpose or single purpose processor as described above. For example, a computer may be a lottery terminal, a kiosk, a vending machine, a set top box ("STB"), cell phone, portable media player, or the like.

Figure 10:
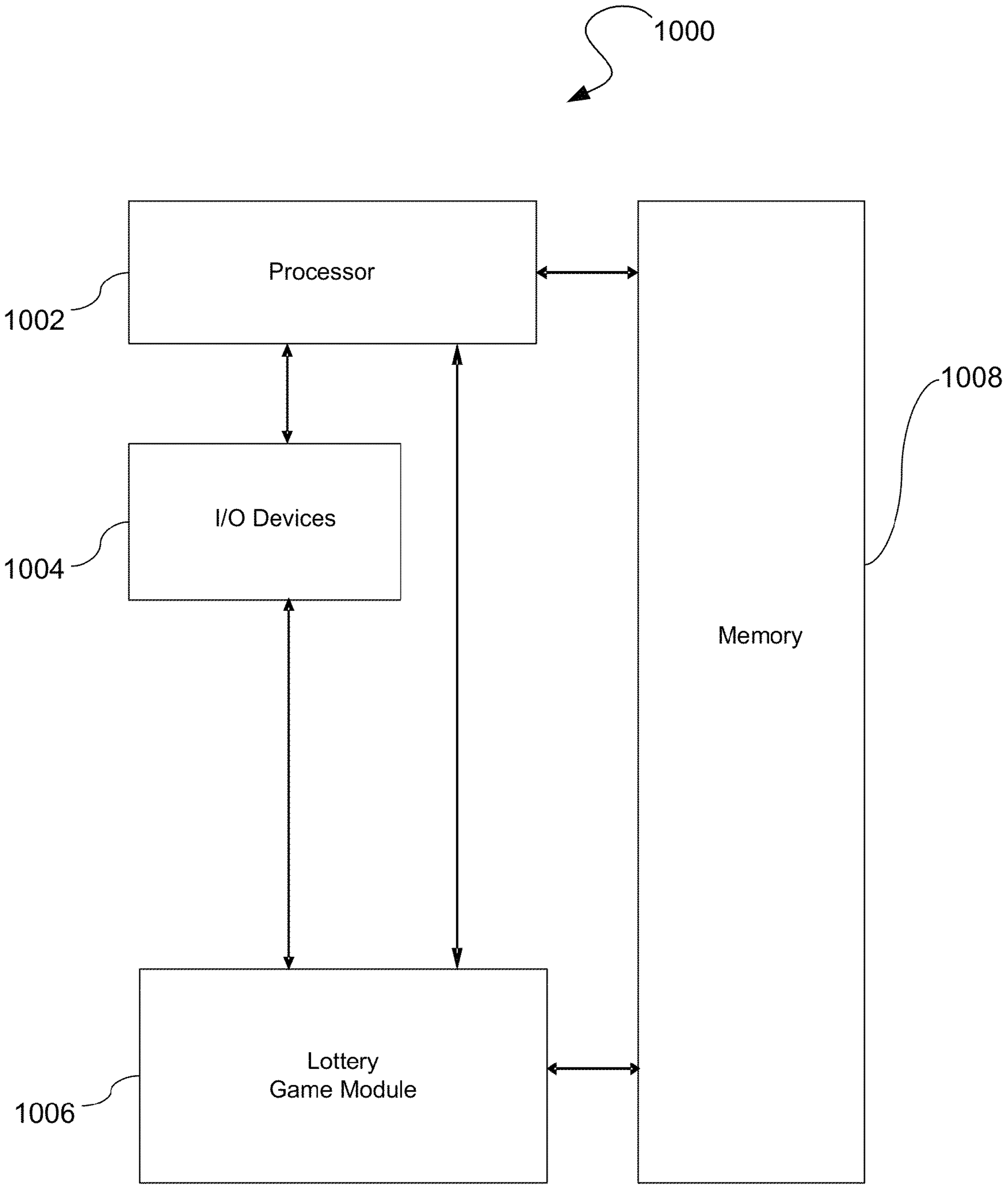
FIG. 10 illustrates a block diagram of a station or system 1000 that provides a lottery game.

FIG. 10 illustrates a block diagram of a station or system 1000 that provides a lottery game. In one embodiment, the station or system 1000 is implemented utilizing a general purpose computer or any other hardware equivalents. Thus, the station or system 1000 comprises a processor 1002, a memory 1008, e.g., random access memory ("RAM") and/or read only memory (ROM), a lottery game module 1006, and various input/output devices 1004, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the lottery game module 1006 may be implemented as one or more physical devices that are coupled to the processor 1002. For example, the lottery game module 1006 may include a plurality of modules. Alternatively, the lottery game module 1006 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor in the memory 1008 of the computer. As such, the lottery game module 1006 (including associated data structures) of the present disclosure may be stored on a computer readable medium, e.g., RAM memory, magnetic or optical drive or diskette and the like.

The station or system 1000 may be utilized to implement any of the configurations herein. For example, the processor 1002 may be utilized to establish a game, operate a game, perform calculations, or the like.

A virtual device may be utilized to provide any of the games provided herein. For example, a virtual lottery ticket may be sold rather than a paper ticket. For instance, a player may be able to purchase an electronic version of a ticket through a computing device such as a computer, laptop, kiosk, cell phone, smart phone, personal digital assistant, or the like.

A variety of prizes may be utilized. The illustrated prize structures are utilized only as examples.

Different types of playing card games may be utilized for the instant lottery game and the draw based lottery game. As an example, Blackjack may be utilized for the instant lottery game and Poker may be utilized for the draw based lottery game. Further, different quantities of cards may be utilized for the same game or different games. As an example, the instant lottery game may be based on a set of rules for a five card poker game whereas the draw based lottery game may be based on a set of rules for a seven card poker game. Alternatively, the same quantity of cards may be utilized for the same game or different games. As an example, the instant lottery game may be based on a set of rules for a five card poker game and the draw based lottery game may be based on a set of rules for a five card poker game.

Other types of sets of rules of other games besides card playing games may be utilized. For example, a set of rules based on casino-based games other than card games such as a set of rules for a game that includes at least one flip of a coin, at least one dice roll, at least one roulette spin, and/or at least one of spin of a wheel may be utilized. In one embodiment, a prize distribution may be based on one set of rules of one type of game and a prize distribution may be based on another set of rules of another type of game. For example, a first prize distribution may be based on a dice roll and a second prize distribution may be based on a playing card game. In another embodiment, a prize distribution may be based on one set of rules of one type of game and a prize distribution may be based on the same set of rules of that game. In yet another embodiment, the same set of rules for the same game may be utilized, but different quantities may be utilized in different prize distributions. For example, a first prize distribution may be based on a single flip of a coin whereas a second prize distribution may be based on two flips of a coin. In another embodiment, the same set of rules for the same game may be utilized with the same quantity. For example, a first prize distribution may be based on a single flip of a coin and a second prize distribution may be based on a second flip a coin. The instant and/or draw based formats may be utilized for the same or different games. Further, in one embodiment, an additional prize level may be utilized that is based on a combination of outcomes in the games.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A method comprising:

establishing an instant lottery game and a draw based lottery game, the instant lottery game being based on a set of rules of a playing card game, the draw based lottery game being based on a symbol matching set of rules;

generating, with a processor, a random selection of a subset of a deck of playing card indicia concurrently with a purchase of a lottery ticket having the instant lottery game and the draw based lottery game;

printing, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia;

generating, with the processor, a random selection of a set of player numbers;

printing, with the ticket printer, the set of player numbers on the lottery ticket such that each player number in the set of player numbers corresponds to one of the indicium in the plurality of order indicia;

providing an instant lottery game prize distribution to a player that purchases the ticket if an instant portion of the subset of the deck of playing card indicia associated with a portion of the plurality of order indicia that is determined by the set of player numbers corresponds to a first winning playing card hand according to the set of rules of the playing card game;

performing a random selection of a set of draw indicia subsequent to the purchase of the lottery ticket; and providing a draw based lottery game prize distribution to the player that purchases the ticket if the instant portion of the subset of the deck of playing card indicia matches the set of draw indicia.

2. The method of claim 1, wherein the playing card game is poker.

3. The method of claim 1, wherein the subset of the deck of playing card indicia is printed on the lottery ticket in the order of the random selection in a plurality of rows.

4. The method of claim 1, wherein the subset of the deck of playing card indicia is printed on the lottery ticket in the order of the random selection in a plurality of columns.

5. The method of claim 1, wherein the plurality of order indicia is printed on the lottery ticket such that each indicium in the plurality of order indicia is printed within the playing card indicium in the deck of playing card indicia having an association therewith.

6. The method of claim 1, wherein the plurality of order indicia is printed on the lottery ticket such that each indicium in the plurality of order indicia is printed on the playing card indicium in the deck of playing card indicia having an association therewith.

7. The method of claim 1, wherein the plurality of order indicia is printed on the lottery ticket such that each indicium in the plurality of order indicia is printed in proximity to the playing card indicium in the deck of playing card indicia having an association therewith.

8. A method comprising:

establishing an instant lottery game, the instant lottery game being based on a set of rules of a playing card game;

generating, with a processor, a random selection of a subset of a deck of playing card indicia concurrently with a purchase of a lottery ticket having the instant lottery game;

printing, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia;

generating, with the processor, a random selection of a set of player numbers;

printing, with the ticket printer, the set of player numbers on the lottery ticket such that each player number in the set of player numbers corresponds to one of the indicium in the plurality of order indicia; and providing an instant lottery game prize distribution to a player that purchases the ticket if an instant portion of the subset of the deck of playing card indicia associated with a portion of the plurality of order indicia that is determined by the set of player numbers corresponds to a first winning playing card hand according to the set of rules of the playing card game.

9. The method of claim 8, wherein the playing card game is poker.

10. The method of claim 8, wherein the subset of the deck of playing card indicia is printed on the lottery ticket in the order of the random selection in a plurality of rows.

11. The method of claim 8, wherein the subset of the deck of playing card indicia is printed on the lottery ticket in the order of the random selection in a plurality of columns.

12. The method of claim 8, wherein the plurality of order indicia is printed on the lottery ticket such that each indicium in the plurality of order indicia is printed within the playing card indicium in the deck of playing card indicia having an association therewith.

13. The method of claim 8, wherein the plurality of order indicia is printed on the lottery ticket such that each indicium in the plurality of order indicia is printed on the playing card indicium in the deck of playing card indicia having an association therewith.

14. The method of claim 8, wherein the plurality of order indicia is printed on the lottery ticket such that each indicium in the plurality of order indicia is printed in proximity to the playing card indicium in the deck of playing card indicia having an association therewith.

15. A method comprising:

establishing a draw based lottery game, the draw based lottery game being based on a set of rules of a playing card game;

generating, with a processor, a random selection of a subset of a deck of playing card indicia concurrently with a purchase of a lottery ticket having the draw based lottery game;

printing, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia;

performing a random selection of a set of draw indicia subsequent to the purchase of the lottery ticket; and providing a draw based lottery game prize distribution to a player that purchases the ticket if a portion of the subset of the deck of playing card indicia associated with a portion of the plurality of order indicia that is determined by the set of draw indicia corresponds to a winning playing card hand according to the set of rules of the playing card game.

16. The method of claim 15, wherein the playing card game is poker.

17. The method of claim 15, wherein the subset of the deck of playing card indicia is printed on the lottery ticket in the order of the random selection in a plurality of rows.

18. The method of claim 15, wherein the subset of the deck of playing card indicia is printed on the lottery ticket in the order of the random selection in a plurality of columns.

19. The method of claim 15, wherein the plurality of order indicia is printed on the lottery ticket such that each indicium in the plurality of order indicia is printed within the playing card indicium in the deck of playing card indicia having an association therewith.

20. A method comprising:

establishing a draw based lottery game, the draw based lottery game being based on a set of rules of a playing card game and a symbol matching set of rules;

generating, with a processor, a random selection of a subset of a deck of playing card indicia concurrently with a purchase of a lottery ticket having the draw based lottery game;

printing, with a ticket printer, the subset of the deck of playing card indicia on a lottery ticket according to an order of the random selection and a plurality of order indicia such that each indicium in the plurality of order indicia has an association with a playing card indicium in the deck of playing card indicia to indicate an order in the subset of the deck of playing card indicia;

performing a random selection of a set of draw indicia subsequent to the purchase of the lottery ticket;

performing a random selection of a set of draw symbols subsequent to the purchase of the lottery ticket;

providing a first draw based lottery game prize distribution to a player that purchases the ticket if a portion of the subset of the deck of playing card indicia associated with a portion of the plurality of order indicia that is determined by the set of draw indicia corresponds to a winning playing card hand according to the set of rules of the playing card game; and providing a second draw based lottery game prize distribution to a player that purchases the ticket if a portion of the subset of the deck of playing card indicia associated with a portion of the plurality of order indicia that is determined by the set of draw indicia matches the set of draw symbols.

* * * * *